United States Patent
Bundy et al.

(10) Patent No.: US 10,486,602 B1
(45) Date of Patent: Nov. 26, 2019

(54) VEHICLE SIDE RAIL HAVING ONE OR MORE STEPS WITH A BRACED FRONT END AND A NON-BRACED BACK END

(71) Applicant: Iron Cross Automotive, Inc., Tulsa, OK (US)

(72) Inventors: Troy D. Bundy, Tulsa, OK (US); Don Bundy, Tulsa, OK (US); Eric Long, Tulsa, OK (US); Cole Stevens, Tulsa, OK (US)

(73) Assignee: Iron Cross Automotive, Inc., Tulsa, OK (US)

( * ) Notice: Subject to any disclaimer, the term of this patent is extended or adjusted under 35 U.S.C. 154(b) by 0 days.

(21) Appl. No.: 15/638,944

(22) Filed: Jun. 30, 2017

Related U.S. Application Data

(60) Provisional application No. 62/415,213, filed on Oct. 31, 2016, provisional application No. 62/417,821, filed on Nov. 4, 2016, provisional application No. 62/458,931, filed on Feb. 14, 2017.

(51) Int. Cl.
*B60R 3/00* (2006.01)
(52) U.S. Cl.
CPC .................. *B60R 3/002* (2013.01)
(58) Field of Classification Search
CPC .......... B60R 3/002; B60R 3/00; B60R 3/007; B60R 3/02; B60R 3/04; B60R 9/02
See application file for complete search history.

(56) References Cited

U.S. PATENT DOCUMENTS

| | | | |
|---|---|---|---|
| D330,536 S | | 10/1992 | Holloway et al. |
| D440,931 S | * | 4/2001 | Knight, III ................... D12/203 |
| D494,914 S | | 8/2004 | Elwell et al. |
| D495,283 S | | 8/2004 | Ashley et al. |
| D495,646 S | | 9/2004 | Elwell et al. |
| D505,901 S | | 6/2005 | Wang |
| D513,217 S | | 12/2005 | Daws et al. |
| D532,354 S | | 11/2006 | Storer |
| D559,164 S | * | 1/2008 | Spera ........................... D12/203 |
| D568,222 S | | 5/2008 | Storer |
| 7,390,003 B1 | * | 6/2008 | Sylvia ..................... B60R 3/007 |
| | | | 280/163 |
| 7,699,328 B2 | * | 4/2010 | Crawford .................. B60R 3/02 |
| | | | 280/163 |
| D618,148 S | | 6/2010 | Hoppert |
| D632,627 S | | 2/2011 | Huang-Tsai |
| D634,687 S | | 3/2011 | Vukel |
| 7,909,344 B1 | * | 3/2011 | Bundy ...................... B60R 3/02 |
| | | | 280/163 |

(Continued)

*Primary Examiner* — James M Dolak
(74) *Attorney, Agent, or Firm* — Gable Gotwals

(57) ABSTRACT

A vehicle side or step rail includes a longitudinal extending vehicle side rail having a vehicle frame-facing side arranged to mount to the frame of a motor vehicle and an outward-facing side to which a leading end of one or more steps is connected to the rail but the trailing end is not. The connection may be in the form of a brace. Depending on where the vehicle mounting points are located relative to the leading end of the step, one or more additional braces can be added. Regardless of whether additional braces are used, the trailing end of the step is not braced or connected to the rail and always extends past the brace. The step surface of the step is always spaced apart from the rail, leaving a gap between it and the outward-facing side of the rail.

15 Claims, 9 Drawing Sheets

(56) References Cited

U.S. PATENT DOCUMENTS

| | | | |
|---|---|---|---|
| 7,946,604 B2 * | 5/2011 | Crandall | B60R 3/002 |
| | | | 280/163 |
| 8,152,187 B1 * | 4/2012 | Crandall | B60R 3/002 |
| | | | 105/443 |
| D665,713 S | 8/2012 | Pochurek et al. | |
| D671,874 S | 12/2012 | Kekich, Jr. et al. | |
| D672,302 S | 12/2012 | Curt et al. | |
| D673,890 S | 1/2013 | Bundy | |
| D673,891 S | 1/2013 | Bundy | |
| 8,641,068 B1 * | 2/2014 | Bundy | B60R 3/00 |
| | | | 280/163 |
| D720,674 S | 1/2015 | Stanesic et al. | |
| D731,384 S | 6/2015 | Farr | |
| D737,188 S | 8/2015 | Perkins | |
| D738,803 S | 9/2015 | Zhu | |
| D739,322 S | 9/2015 | Villareal | |
| D757,622 S | 5/2016 | Wolf | |
| 9,346,404 B1 * | 5/2016 | Bundy | B60R 3/00 |
| 9,463,745 B2 * | 10/2016 | Reynolds | B60R 9/02 |
| D772,116 S | 11/2016 | Wu | |
| 9,511,716 B2 * | 12/2016 | Montoya | B60R 9/02 |
| D794,525 S | 8/2017 | Chen | |
| 9,758,104 B2 * | 9/2017 | Fichter | B60R 3/00 |
| 10,272,841 B1 * | 4/2019 | Wymore | B60R 3/002 |
| 10,279,764 B1 * | 5/2019 | Wymore | B60R 3/002 |
| 2003/0222423 A1 | 12/2003 | Weir | |
| 2012/0228848 A1 | 9/2012 | Fichter | |
| 2016/0059774 A1 | 3/2016 | Crandall et al. | |

* cited by examiner

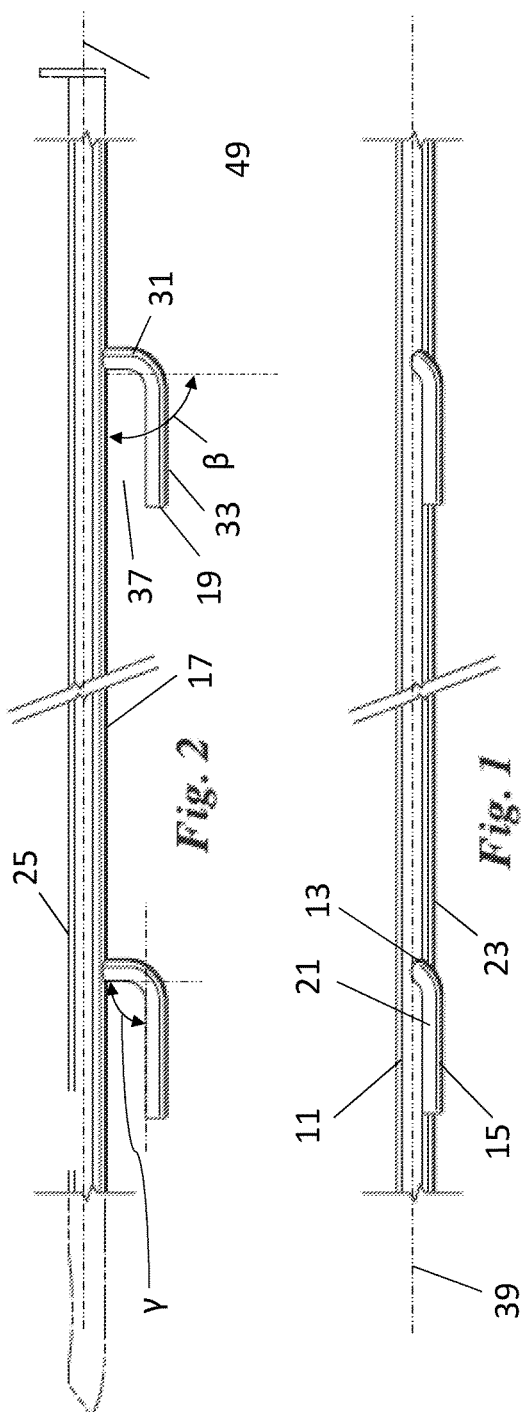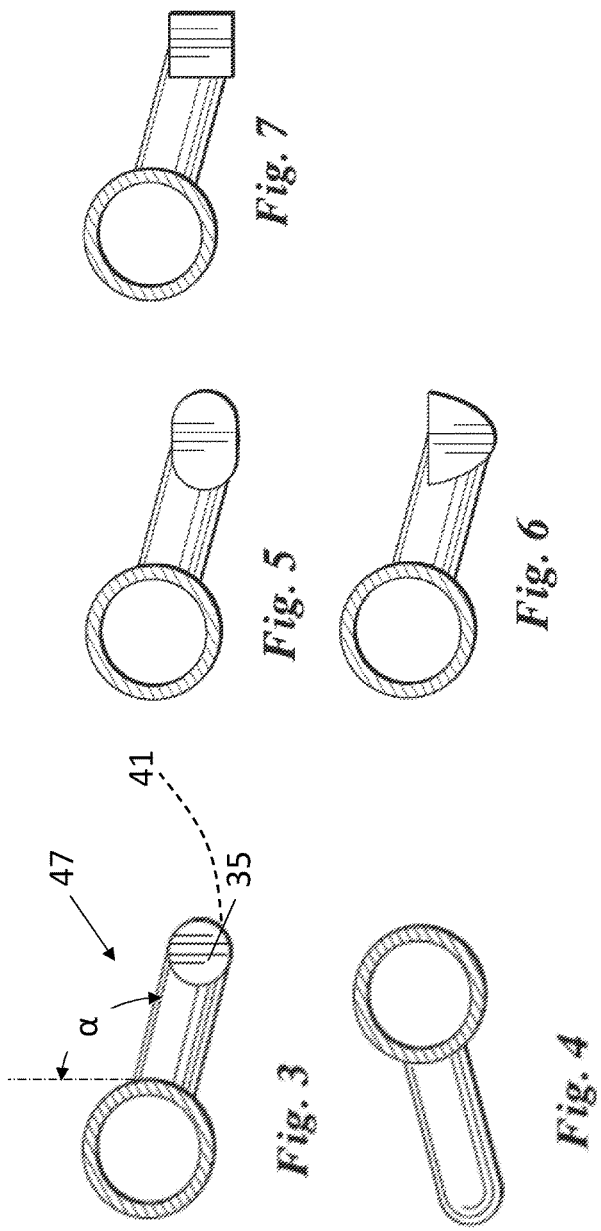

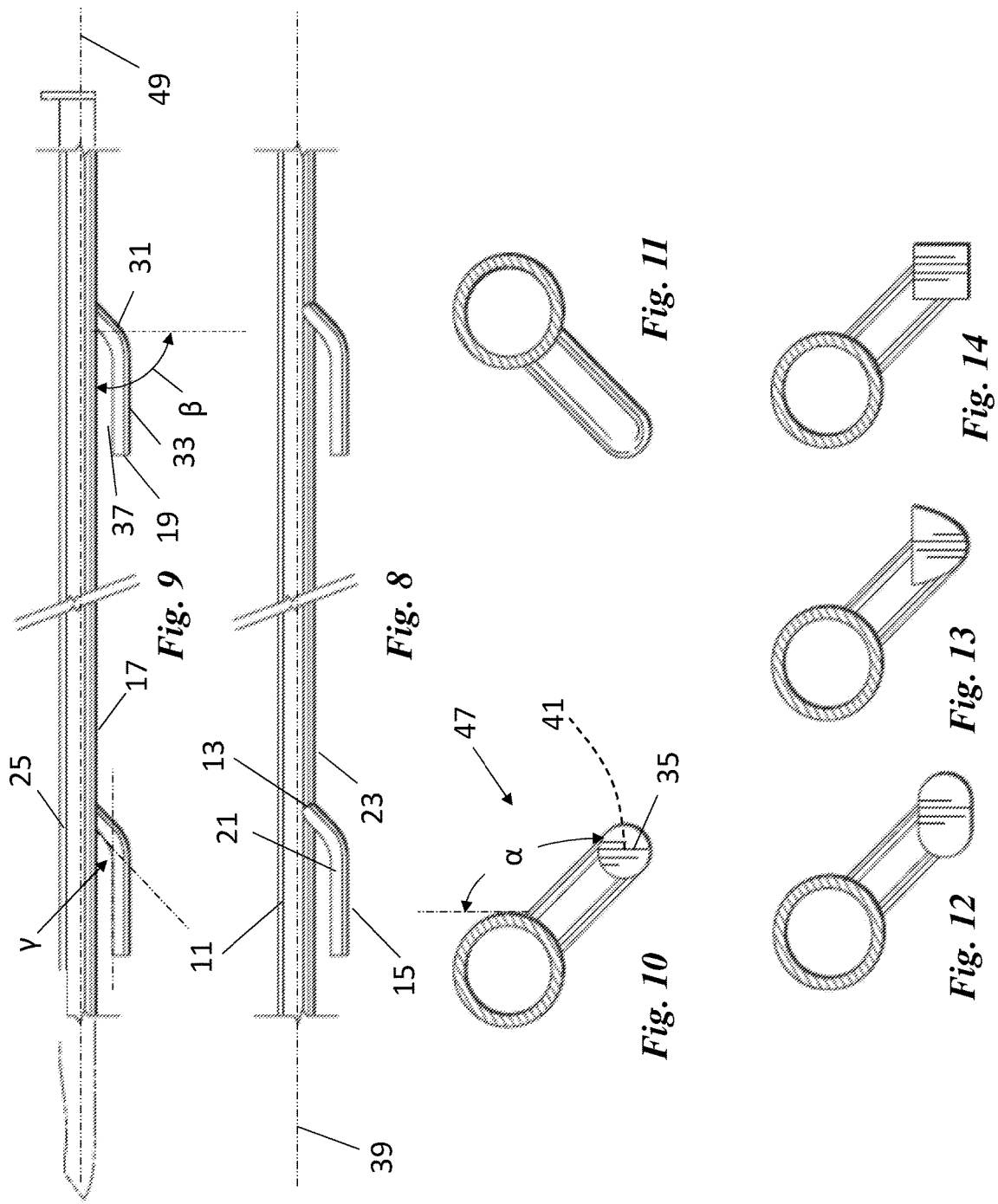

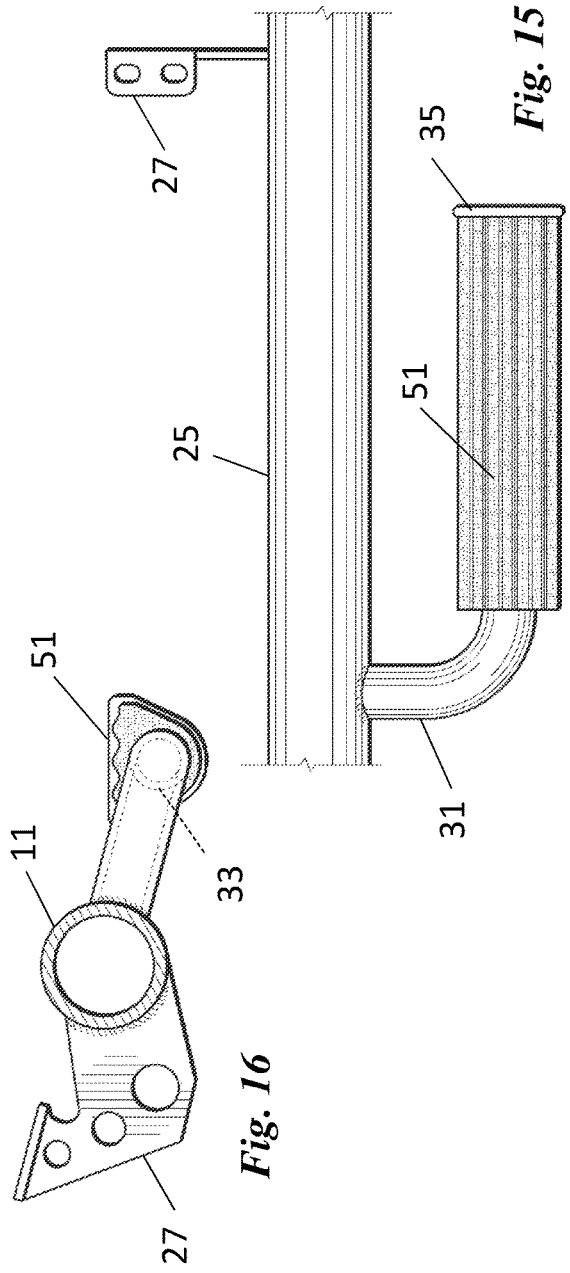
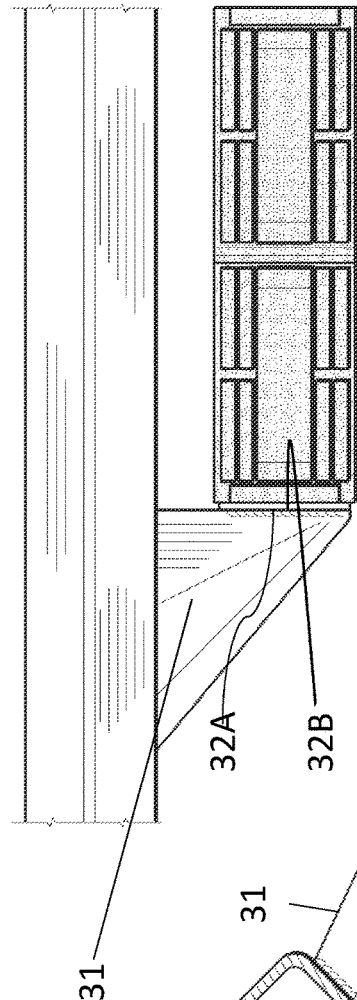
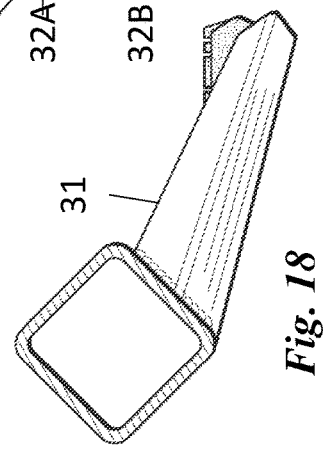

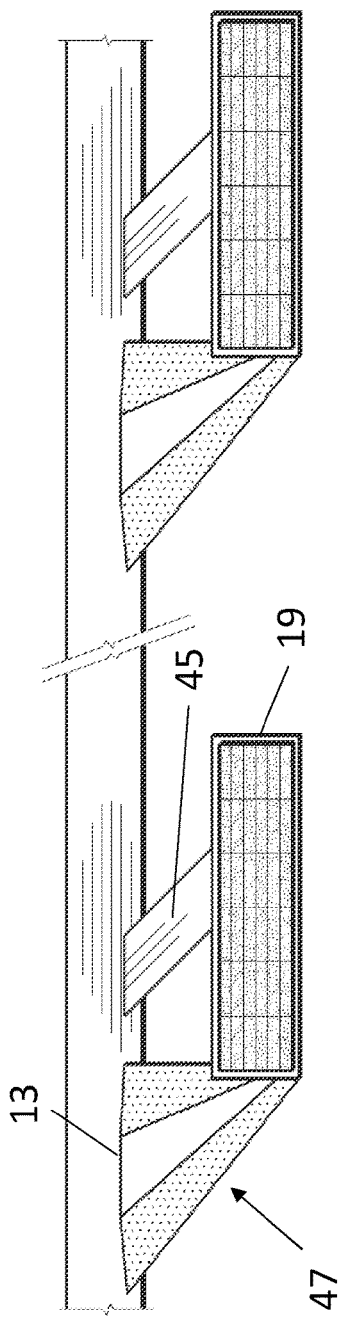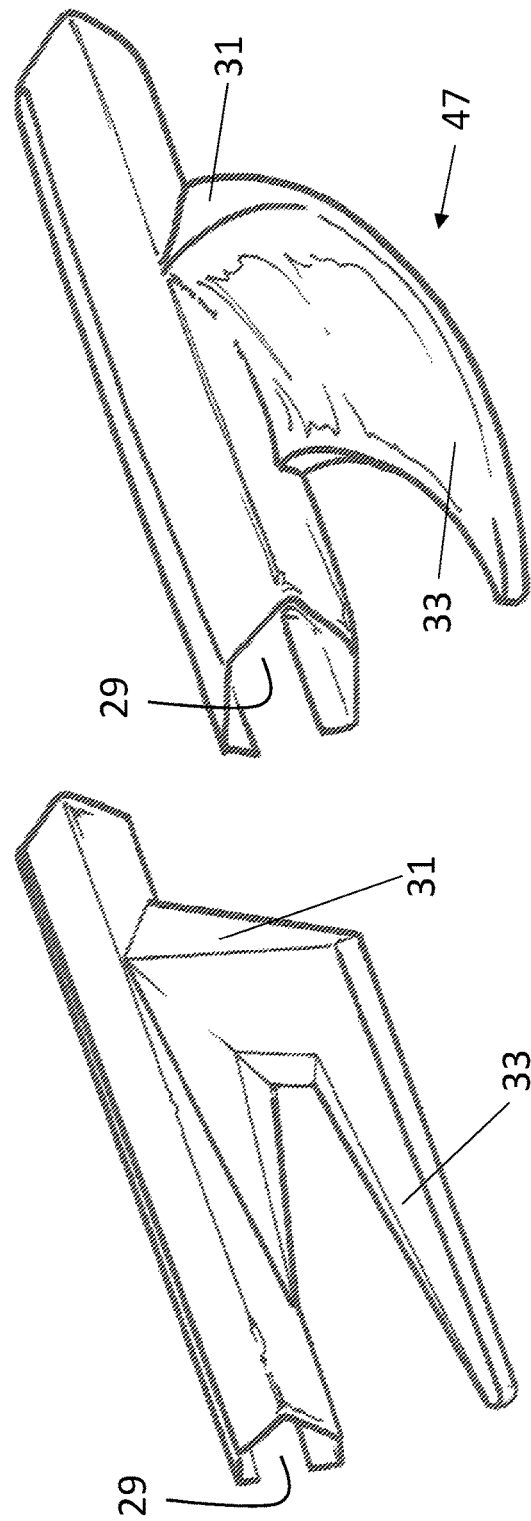

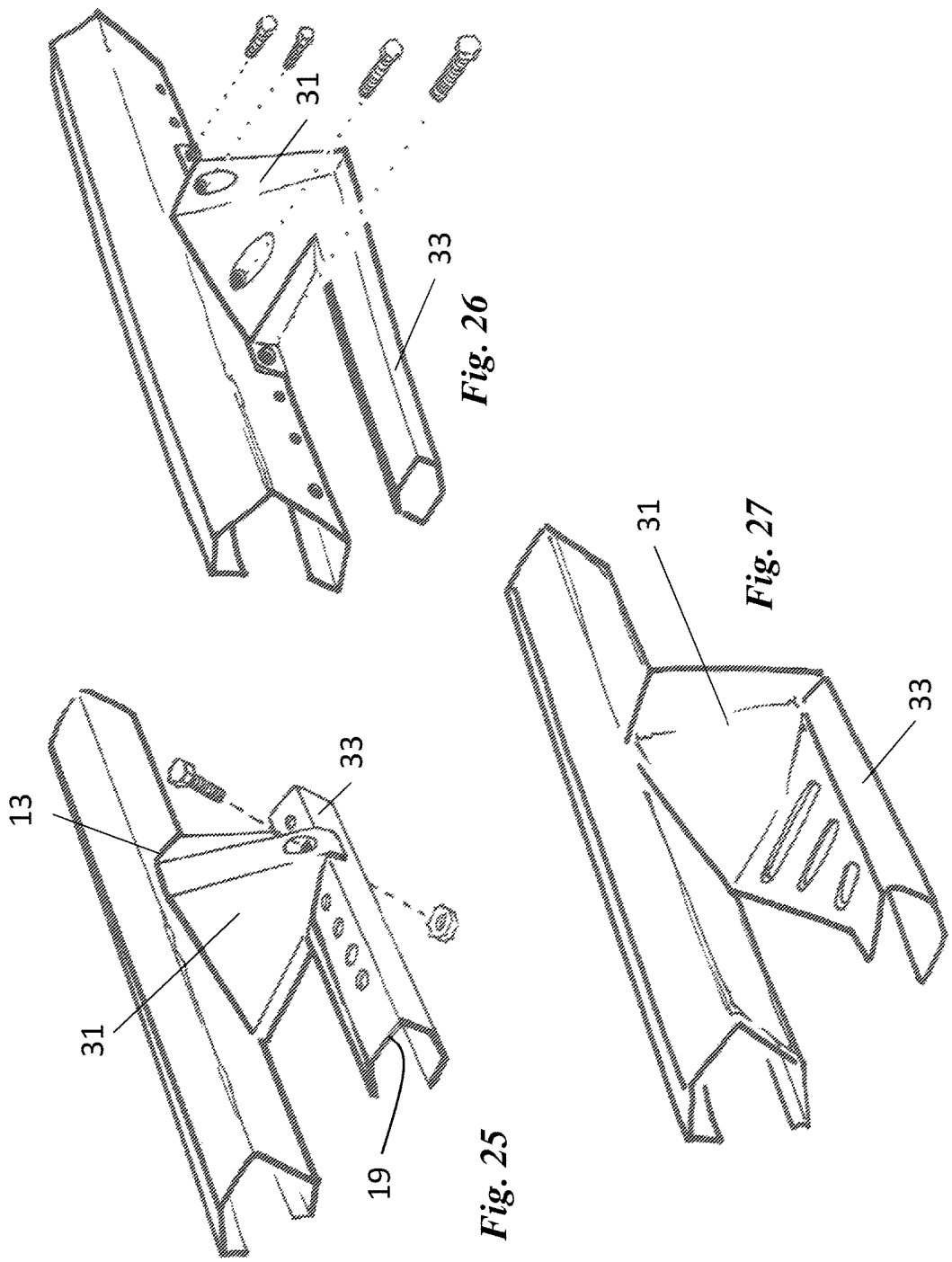

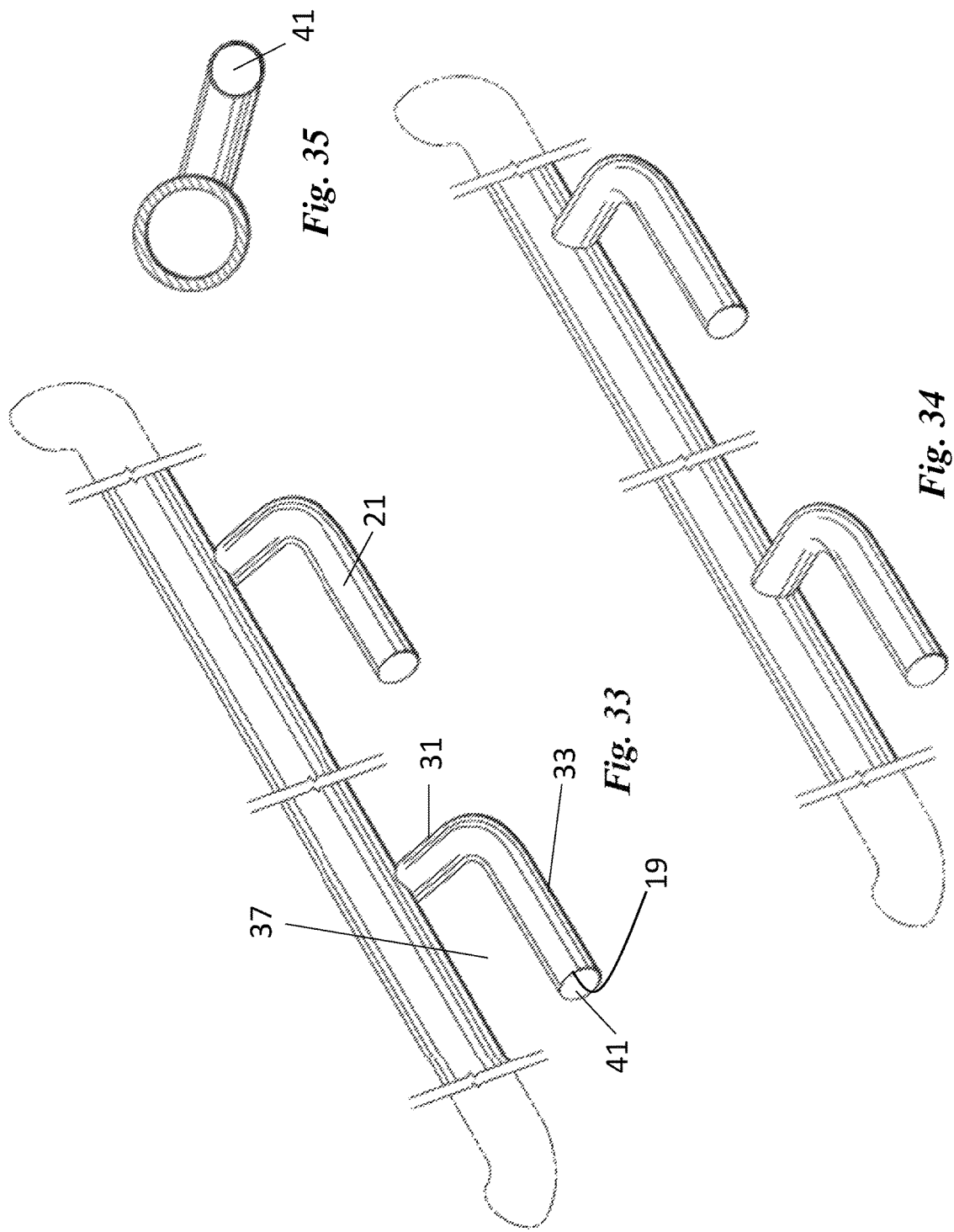

VEHICLE SIDE RAIL HAVING ONE OR MORE STEPS WITH A BRACED FRONT END AND A NON-BRACED BACK END

CROSS-REFERENCE TO CO-PENDING APPLICATIONS

This application claims priority to and the benefit of U.S. 62/415,213 filed Oct. 31, 2016, U.S. 62/417,821 filed Nov. 4, 2016, and U.S. 62/458,931 filed Feb. 14, 2017.

BACKGROUND

This disclosure is in the field of vehicle side or step rails made of a decorative tube or channel with steps connected to the tube or channel at vehicle entry points. These prior art rails include steps that are either formed as part of the rail itself or steps that connect at each end to the rail or the vehicle frame.

SUMMARY

Embodiments of a vehicle side or step rail includes a longitudinal extending vehicle side rail having a vehicle frame-facing side arranged to mount to the frame of a motor vehicle and an outward-facing side to which a leading end of one or more steps is connected to the rail but the trailing end is not. The connection may be in the form of a brace. Depending on where the vehicle mounting points are located relative to the leading end of the step, one or more additional braces can be added. Regardless of whether additional braces are used, the trailing end of the step is not braced or connected to the rail and always extends past the brace. The step surface of the step is always spaced apart from the rail, leaving a gap between it and the outward-facing side of the rail.

BRIEF DESCRIPTION OF THE DRAWINGS

FIG. 1 is a front elevation view of an embodiment of a vehicle side or step rail having only one end connected to the rail.

FIG. 2 is a top plan view of the rail and step of FIG. 1.

FIG. 3 is a left side elevation view of the rail and step of FIG. 1. The step has a circular-shaped cross section.

FIG. 4 is a right side elevation view of the rail and step of FIG. 1.

FIG. 5 is an embodiment of the step having an oval-shaped cross section.

FIG. 6 is an embodiment of the step having an semi-circular shaped cross section.

FIG. 7 is an embodiment of the step having a square-shaped cross section.

FIG. 8 is a front elevation view of another embodiment of a vehicle side or step rail having only one end connected to the rail.

FIG. 9 is a top plan view of the rail and step of FIG. 8.

FIG. 10 is a left side elevation view of the rail and step of FIG. 8. The step has a circular-shaped cross section.

FIG. 11 is a right side elevation view of the rail and step of FIG. 8.

FIG. 12 is an embodiment of the step having an oval-shaped cross section.

FIG. 13 is an embodiment of the step having an semi-circular shaped cross section.

FIG. 14 is an embodiment of the step having a square-shaped cross section.

FIG. 15 is a top plan view of an embodiment of the step having a step pad.

FIG. 16 is a side elevation view of the step of FIG. 15.

FIG. 17 is a top plan view of an embodiment of the vehicle rail and step that includes a brace for connection to the rail.

FIG. 18 is a side elevation view of the step of FIG. 17.

FIG. 19 is a top plan view of an embodiment of the vehicle rail and step that includes an additional brace.

FIGS. 20 to 27 are perspective views in sketch form of other embodiments of the vehicle rail and step. The rail may be extended lengthwise and additional steps added.

FIG. 20 is an embodiment of the step having angled surfaces and connected to a rail having an open channel shape.

FIG. 21 is an embodiment of the step having a curving wing-like shape.

FIG. 22 is an embodiment of the step having a semi-circular shaped cross section and a tread plate design on its upper surface.

FIG. 23 is an embodiment of the step having a circular-shaped cross section.

FIG. 24 is an embodiment of the step having an oval-shaped cross section with a tread plate design on its upper surface.

FIG. 25 is an embodiment of the step having an angled shape similar to that of the rail and illustrating how the step may be adjustable and mounted to the brace using fasteners.

FIG. 26 is an embodiment of the step illustrating how the step may be adjustable and mounted to the rail with fasteners.

FIG. 27 is an embodiment of the step including an open channel shape.

FIG. 33 is a perspective view of another embodiment of the vehicle step rail and step.

FIG. 34 is a perspective view of yet another embodiment.

FIG. 35 is a left-side elevation view of an embodiment.

ELEMENTS AND NUMBERING USED IN THE DRAWINGS AND DETAILED DESCRIPTION

Figure 23:
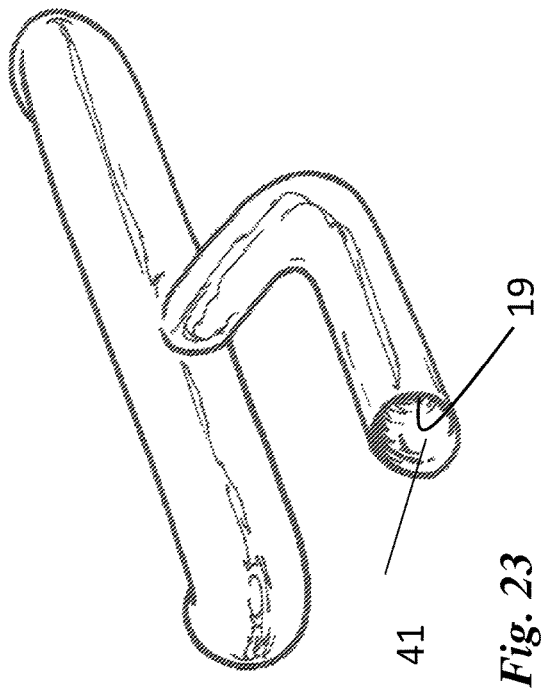
Figure 22:
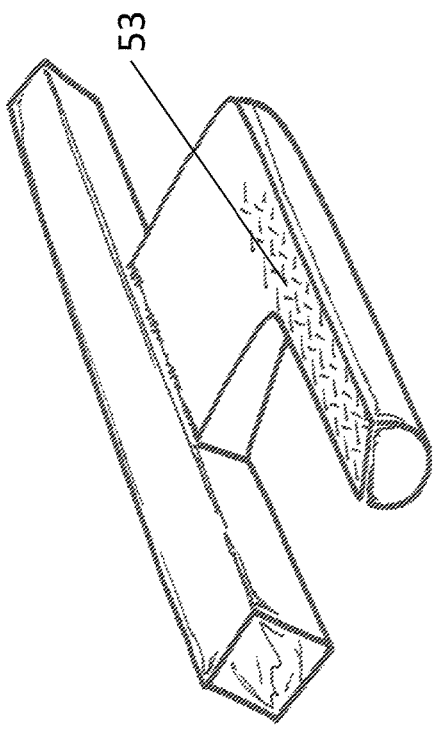
Figure 24:
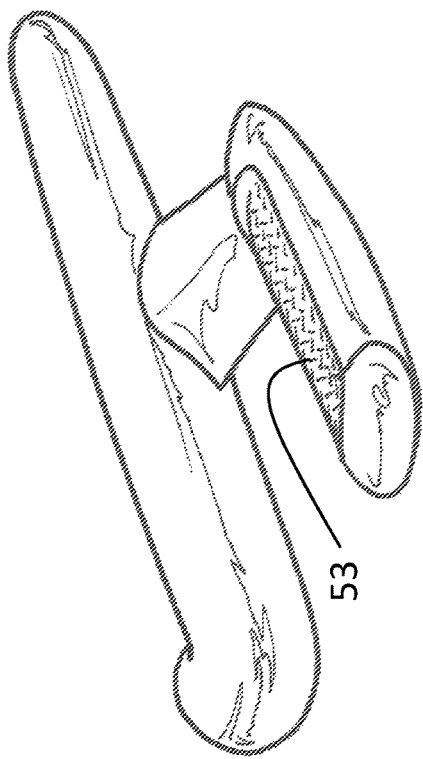
Figure 28:
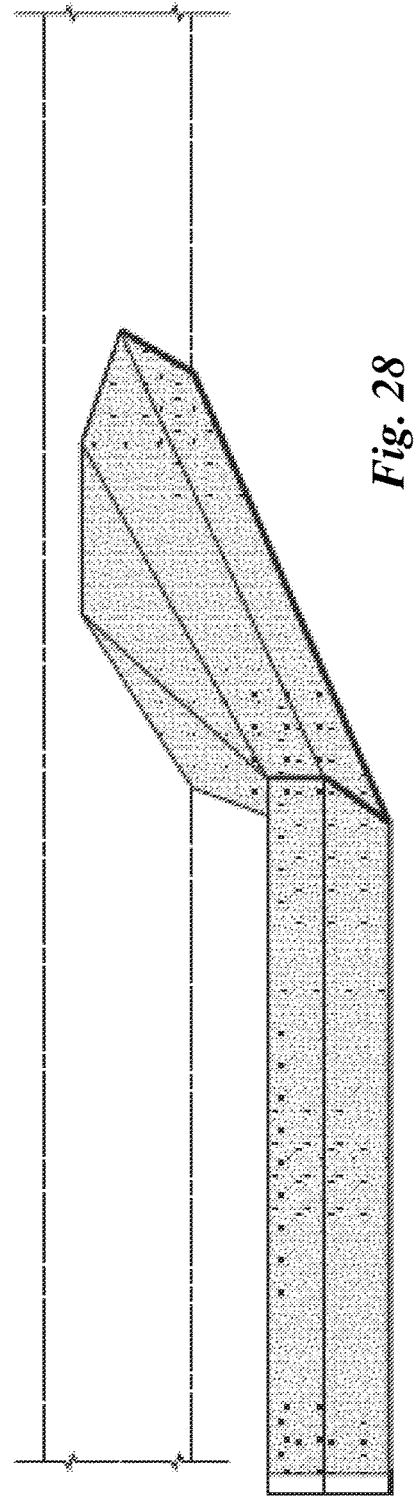
FIG. 28 is a front elevation view of another embodiment of the step.

11 Vehicle side rail
13 Leading (first or connected) end of 15
15 Step
17 Outward-facing side of 11
19 Trailing (second or free) end of 15
21 Step surface
23 Lower or bottom end of 11
25 Vehicle frame-facing side of 11
27 Bracket
29 Open channel
31 First leg
32 Opposing end
33 Second leg
35 Cap
37 Gap
39 Midline of 11 (top-to-bottom)
41 Interior of 15
47 Exterior profile
49 Longitudinal centerline of 11 (left-to-right)

51 Step pad
53 Tread plating

DETAILED DESCRIPTION

Embodiments of a vehicle side rail include at least one step that has a step surface spaced apart from an outward-facing side of the vehicle side rail, with the at least one step having one end only connected to the vehicle rail and another end not connected to the vehicle rail by any structure extending from that end to the vehicle rail. The step is a separate structure apart from the rail. In some embodiments, the step may be connected to the vehicle frame and given the appearance that its leading end is connected to the rail, the other end remaining a free end.

In other embodiments of the vehicle side rail the step includes two legs in contact with one another, the first leg having one end connected to the vehicle side rail and extending outwardly from the vehicle side rail and the second leg providing the step surface and extending away from the first leg, with the second leg including a free end not connected to the vehicle rail by any structure extending from the free end to the vehicle side rail. The free end can be capped.

The first leg may also extend in a downward direction, a rearward direction, or a downward and rearward direction from the vehicle side rail. Although not as aesthetically pleasing, the first leg may extend in the forward direction rather than the rearward direction.

In some embodiments, the step includes a brace extending between the vehicle side rail and the second leg, with the free end of the second leg extending past the brace. The brace can be located in a first two-thirds of the second leg as measured from where the second leg connects to the first leg.

The first and second legs can form a single-piece or can be connected as separate pieces. In embodiments, the legs form a weldment. The legs may be identical to, or different from, one another in length, width, or shape (or some combination thereof). The first and second legs may include a curved exterior profile or an angled exterior profile.

In yet other embodiments, the vehicle side rail includes at least one step having a connected end in contact with and extending outwardly from the vehicle side rail, a free end not connected by any structure extending from the free end to the vehicle side rail, and a step surface located between the connected end and the free end. At least one brace may be located in a first two-thirds of the horizontal distance or spacing between the connected end and the free end as measured from the free end.

Referring to the drawing figures, embodiments of a vehicle side rail 11 of this disclosure includes at least one step 15 with a leading (first) end 13 of the step 15 connected to an outward-facing side 17 of the rail 11 but the trailing (second) end 19 of step 15 is not. The leading end 13 of the step may be centered at or below a midline 39 of the rail 11. The end 13 can be welded to the rail 11, forming a weldment with the rail, fastened to the rail 11, or welded and fastened. In all cases, the trailing end 19 is a free-end, with no structure connected to and extending from it to rail 11.

Figure 29:
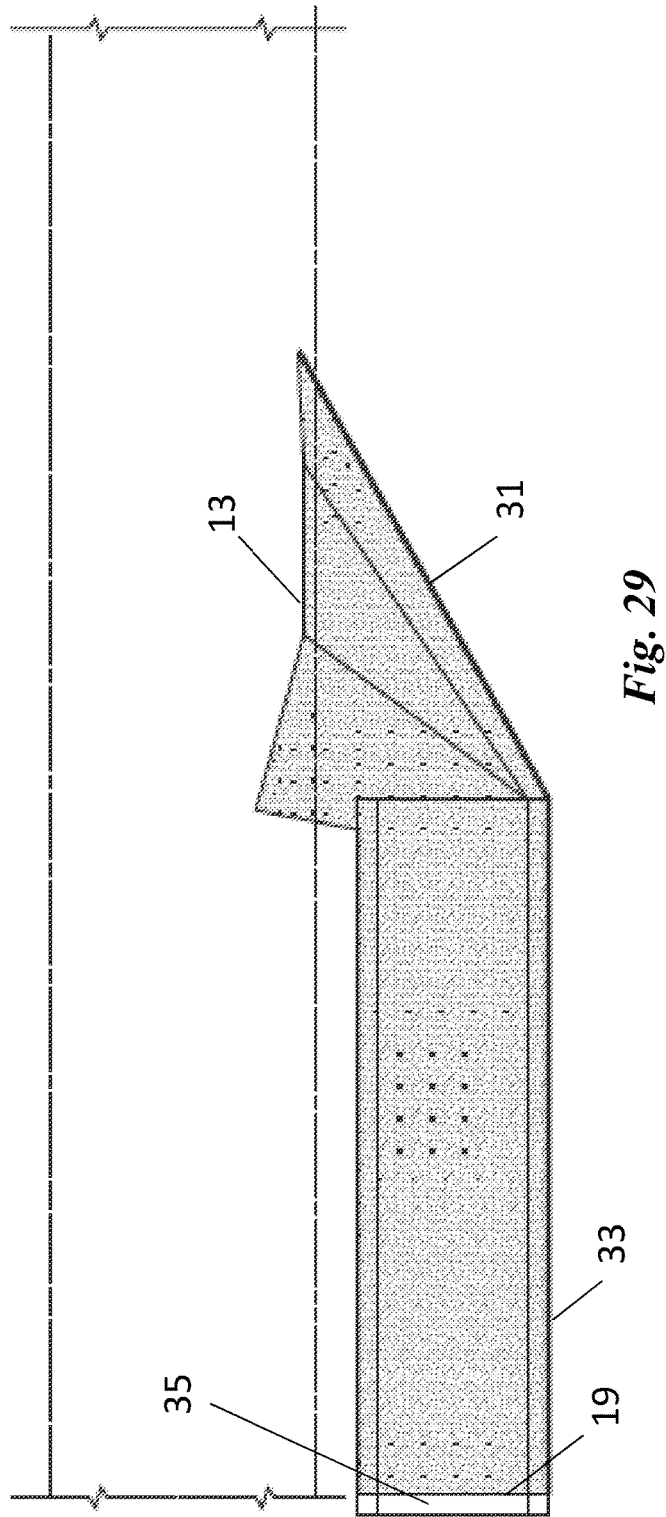
FIG. 29 is a top plan view of the step of FIG. 28.
Figure 32:
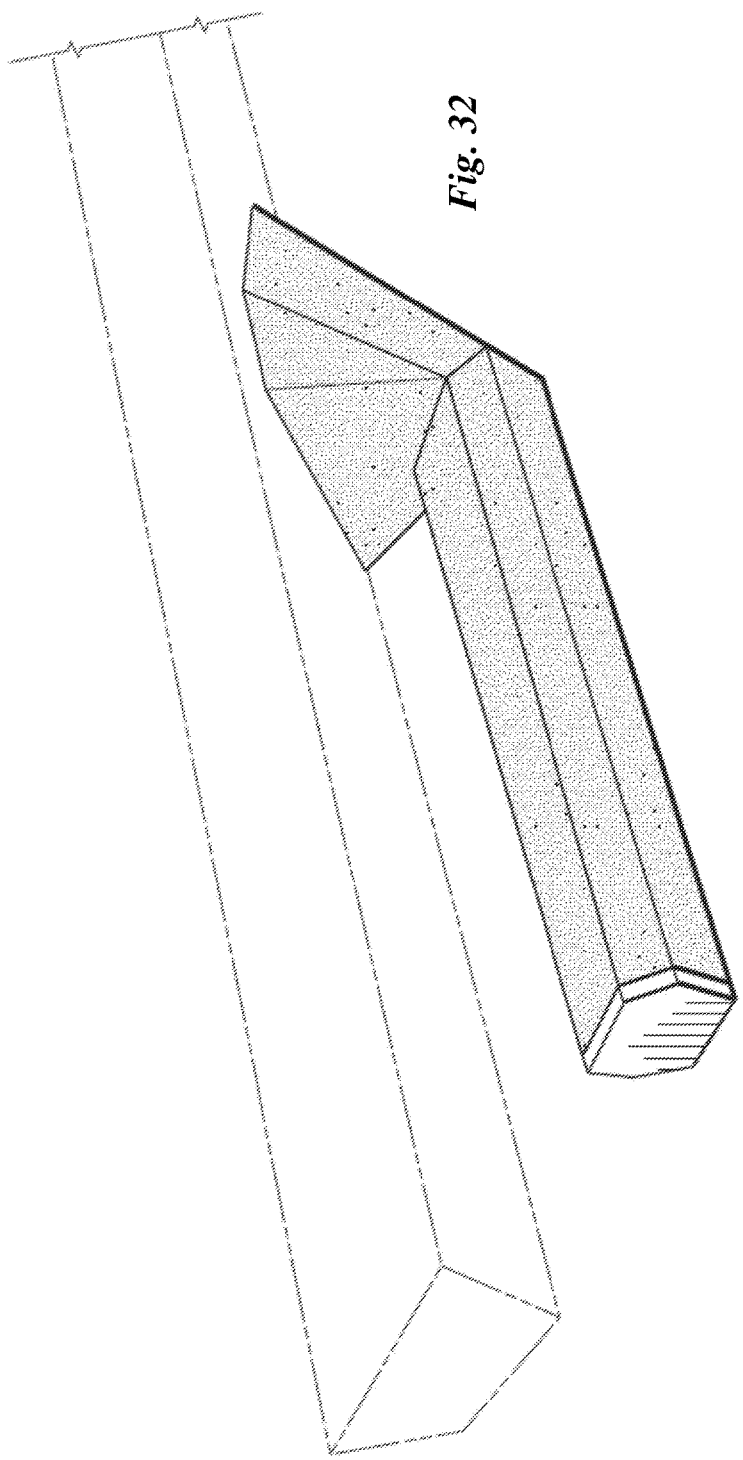
FIG. 32 is a perspective view of the step of FIG. 28.
Figure 31:
FIG. 31 is a right side elevation view of the step of FIG. 28.
Figure 30:
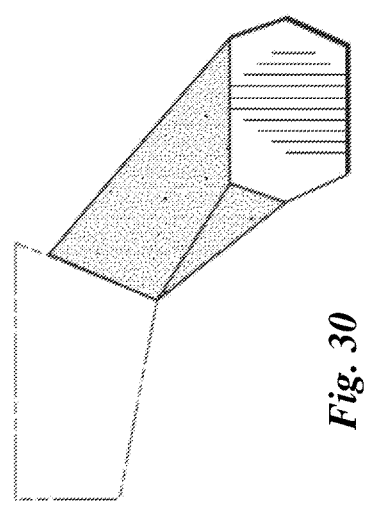
FIG. 30 is a left side elevation view of the step of FIG. 28.

The step 15 also may include a step pad 51, tread plating 53, or other step coverings on the step surface 21 that provide traction or improved aesthetics (see e.g. FIGS. 15-19, 22 & 24). In some embodiments, the step 15 may include a hollow interior 41 and an end cap 35 on the trailing end 19. The cap 35 may have a same or similar surface finish to that of step 15 or may be a different material with a different surface finish as that of the step 15 (see e.g. FIGS. 15 & 29). Persons of skill in the art would recognize that other embodiments not shown with an end cap 35 may include a cap. In other embodiments, the step 15 may include a solid interior 41 with trailing end 19 having a same or similar surface finish as that of the step 15.

A vehicle frame-facing side 25 of the rail 11 is arranged to connect to one or more mounting brackets 27, see e.g. FIG. 15, that connect the rail 11 to the vehicle frame so that the rail 11 resides below the vehicle's rocker panels. The rail 11 may extend longitudinally along an entire length of the motor vehicle between the front and rear wheel wells or it may extend longitudinally along an entire length of one door or entry point to the vehicle. Regardless of rail length, the step 15 is arranged so that, when the rail 11 is mounted to a motor vehicle, the step surface 21 is below the vehicle entry point.

The mounting points on the frame-facing side 25 of the rail 11 can be fixed or adjustable. If adjustable, the rail 11 typically includes an open channel 29 facing the frame, see e.g. FIG. 20, that is sized to receive a mounting clip or plate (not shown). Rails sold by Iron Cross Automotive (Tulsa, Okla.) are examples of this type of adjustable mounting. The rail 11 itself may be generally cylindrical-shaped or polygonal-shaped, at least on the outward-facing side 17 of the rail 17.

In some embodiments the step 15 is a single-piece, generally L-shaped step when viewed looking directly down on the step, having a first leg 31 serving as a brace for the step 15 and a second leg 33 forming the step surface 21. In these single-piece embodiments, the legs 31, 33 merge into one another. In other embodiments, the step 15 is a two-piece step, again with the first leg 31 serving as a brace and the second leg 33 forming the step surface 21. When arranged as a two-piece step, the legs 31, 33 include opposing ends 32A, 32B where they connect one to the other (see e.g. FIG. 17). This connection may be a welded connection (thereby forming a weldment), a fastened connection, or some combination of a welded and fastened connection.

Regardless of single- or two-piece (or more) construction, to improve aesthetics the exterior profile 47 of the step 15 should generally match that of the rail 11, at least on the rail's outward-facing side 17. The step 15 can be circular-shaped, elliptical- or oval-shaped, semi-circular-shaped, tri-angular-shaped, square-shaped, or rectangular-shaped in cross section. In some embodiments, the step 15 includes one or more angled surfaces on the first leg 31, the second leg 33, or on both legs 31, 33. By way of example, a cylindrical-shaped step 15 may be used on a cylindrical-shaped rail 11 or a polygonal-shaped (angled) step 15 can be used on a polygonal-shaped (angled) rail 11.

In embodiments, the first leg 31 extends outwardly from the rail 11 to create a gap 37 between the second leg 33 and the outward-facing side 17 of the rail. The second leg 33 may run parallel to the longitudinal centerline of the rail 11, with the step surface 21 being horizontal. The length, width, or shape of the legs 31, 33—or some combination of length, width, and shape—may be the same as or different than one another (see e.g. FIGS. 19-34). For example, the leading end 13 of the first leg 31 may match that of, or be wider than, the width or diameter of end 32B of the second leg 33. The first leg 31 may also taper toward the second leg 33 to match that of the second leg 33 at its opposing end 32B. In some embodiments, first leg 31 is triangular-shaped and second leg 33 is cylindrical- or rectangular-shaped in cross-section (see e.g. FIG. 19). In other embodiments, first leg 33 is wedge-shaped and second leg 31 is semi-cylindrical in cross-section (see e.g. FIG. 22). In yet other embodiments, first leg 31 is triangular-, rectangular- or square-shaped and second leg 33 is elliptical- or oval shaped in cross-section. In still other embodiments, the second leg 33 is hexagonal-shaped in cross-section. Other shapes and combinations of shapes can be arranged depending on aesthetics.

The step 15 may be arranged relative to the rail 11 so that the first leg 31 is at an angle α relative to vertical and at an angle β relative to horizontal, with the first leg 31 and second leg 33 being at an angle γ relative to one another. Depending in part on the angle α selected, the step surface 21 may be located above, even with, or below the lower (ground-facing) side 23 of the rail 11. The first leg 31 may also extend past this lower ground-facing side 23 of the rail. Angle α relative to vertical may be about 90°, 105°, 120°, 135°, or 150° from vertical or at some other angle α in a range of 90° to 150°. Angle β may be 15°, 22.5°, 30°, 45°, 60°, 75°, or 90° from horizontal or at some other angle β in a range of 15° to 90°. Angle γ, that is the angle formed between the legs 31, 33, may be 90°, 105°, 120°, 135°, or 150° or at some other angle γ in a range of 90° to 150°.

Depending on where the mounting points are to the motor vehicle relative to the leading end 13 of the step 15, one or more additional braces 45 can be added, spaced-apart from this end 13, to add strength, to minimize or eliminate flexing when under load, or for aesthetic purposes (see e.g. FIG. 19). The additional brace 45 may be at a same or different angle α or β as the first leg 31 to the rail 11 and may have a same, similar, or different exterior profile as the first leg 31. Regardless of whether one, two, or more braces 45 are used, the leading end 13 of the step 15 is connected to the rail 11 and the trailing end 19 always extends past the last brace 45 and is not connected to the rail. Similarly a brace 45 can be used on steps 15 where the step is a single-piece step. The exterior profile of any additional brace 45 can match that, be similar to, or different from the first leg 31.

Routine experimentation may be applied to determine step material, size, and mounting location for particular vehicle applications to provide the desired strength and minimize or eliminate unwanted flexing. In embodiments of the step 15, a 200-pound load on the step surface 21 produces no flex in a horizontal plane at the trailing end 19 of the step. In other embodiments, a 200-pound load produces a ¼ inch or less of flex, a ½ inch or less of flex, ¾ inch or less of flex, 1 inch or less of flex, 1¼ inches or less of flex, or 1½ inches or less of flex.

While this disclosure describes embodiments of a vehicle side rail having one or more steps with a braced front end and a non-braced back end, the embodiments may be subject to certain modifications by those skilled in the art without departing from the scope of this disclosure or the following claims.

What is claimed:

1. A vehicle side rail comprising at least one step including a step surface spaced apart from an outward-facing side of the vehicle side rail, one distal end of the two distal ends being a rail-connected end located on the outward-facing side of the vehicle rail and being the only distal end connected to the vehicle side rail, the step surface extending along its entire length in a horizontal direction rearward of the rail-connected end, another of the two distal ends and the step surface not connected to the vehicle side rail by any structure located between and extending from the step surface and the vehicle side rail.

2. A vehicle side rail comprising at least one step having a step surface spaced apart from an outward-facing side of the vehicle side rail,
the at least one step including two legs in contact with one another,
a first leg of the two legs having one end connected to the outward facing side of the vehicle side rail and extending outwardly from the vehicle side rail and another end connected to an opposing adjacent end of a second leg of the two legs; and
the second leg of the two legs providing a step surface extending along its entire length in a horizontal direction rearward of the one end of the first leg, the second leg including a free end not connected to the vehicle side rail by any structure extending from the free end to the vehicle side rail.

3. The vehicle side rail according to claim 2 further comprising the first leg also extending in a downward direction from the vehicle side rail.

4. The vehicle side rail according to claim 2 further comprising the first leg also extending in a rearward direction from the vehicle side rail.

5. The vehicle side rail according to claim 2 further comprising at least one brace extending between the vehicle side rail and the second leg, the free end of the second leg extending past the at least one brace.

6. The vehicle side rail according to claim 5 further comprising the least one brace being located in a first two-thirds of the second leg as measured from where the second leg connects to the first leg.

7. The vehicle side rail according to claim 2 further comprising the first leg having a different length, a different width, or a different length and width than that of the second leg.

8. The vehicle side rail according to claim 2 further comprising the first leg having a different shape than that of the second leg.

9. The vehicle side rail according to claim 2 further comprising at least one of the first leg and the second leg including a curved exterior profile.

10. The vehicle side rail according to claim 2 further comprising at least one of the first leg and the second leg including an angled exterior profile.

11. The vehicle side rail according to claim 2 further comprising the free end of the second leg including a cap.

12. The vehicle side rail according to claim 2 wherein the first and second legs are separate pieces.

13. The vehicle side rail according to claim 12 wherein the first and second legs form a weldment.

14. A vehicle side rail comprising at least one step including:
a first leg having a connected end connected directly to and extending outwardly from an outward-facing side of the vehicle side rail;
a second leg having an end connected to a bottom end of the first leg and a free end not connected by any structure extending from the free end to the vehicle side rail; and
the second leg including a step surface extending along its entire length in a horizontal direction rearward of the end connected to the bottom end of the first leg to the free end of the second leg.

15. The vehicle side rail according to claim 14 further comprising at least one brace located in a first two-thirds of an entire horizontal spacing between the connected end and the free end as measured from the free end.

* * * * *